Patented Oct. 26, 1926.

1,604,761

UNITED STATES PATENT OFFICE.

JAMES H. SHERTS, OF NEWARK, NEW JERSEY, ASSIGNOR TO E. I. DU PONT DE NEMOURS & COMPANY, OF WILMINGTON, DELAWARE, A CORPORATION OF DELAWARE.

ACTINISMPROOF REENFORCED GLASS.

No Drawing.    Application filed March 12, 1926. Serial No. 94,332.

This invention relates to structures composed of laminations of glass and some less fragile material acting as a strengthening means, for example pyroxylin plastic sheeting, i. e. such structures as are popularly called "safety glass"; and in particular the invention relates to safety glass which is actinism-proof, or non-actinic.

While, fundamentally, the conception of a laminated safety glass with one or more laminations of pyroxylin plastic is sound, the use of such glass as a colorless transparent window is comparatively limited, chiefly for the reason that the strengthening layer of plastic material frequently becomes colored or discolored in the course of time, indicating deterioration, of which further evidence is the development of brittleness, roughening, and crazing, often causing the glass to loosen from the plastic, and even sometimes breaking of the glass. Observation has indicated that this discoloration and decomposition of the plastic is due to the effect of actinic rays of the sun, e. g. ultraviolet light between 2900 and 4000 Angstrom units and principally between 3200 and 3800 units. Various methods of overcoming this difficulty have been proposed but, for a variety of reasons, such as high production cost, and so on, have not proved all that could be desired. I have now devised a safety glass that, while entirely satisfactory as an actinism-proof article, is yet capable of production at a cost sufficiently low to make the glass commercially practicable.

In accordance with the present invention actinic-ray-absorbing or arresting ingredients are incorporated in the safety glass structure. These ingredients may be, for example, beta-methyl umbelliferone, acetamino quinolin, æsculine, anethol, quinine sulphate, ferric chloride, potassium dichromate, nickel chloride in combination with aluminum chloride or calcium chloride, salts of certain metals of high molecular weight such as cadmium, molybdenum, thorium, cerium, uranium and others or various combinations of these. A variety of colors stable to sunlight and which when compounded in an actinic-ray-filtering stratum produce amber, yellow, orange, as well as violet, red, green, and blue, may also be used. These various ingredients may be used as circumstances dictate, as explained more fully hereinafter. The principle involved is that the ingredient used must be capable of reflecting or absorbing actinic light without objectionable deterioration or change in molecular structure of any of the portions of the safety glass, as the ingredient itself, the strengthening sheet, the glass, or the vehicle carrying the ingredient. As an example of a reaction in accordance with this principle would be fluorescence, in which case the harmful actinic rays are converted into nonharmful rays. Another might be the absorption of the harmful actinic rays and the giving of them off in the form on nonharmful heat energy.

In further and more particular accordance with the invention, the ray-arresting ingredient is incorporated in the safety glass structure by way of a ray-filter stratum built into the safety glass structure as an element initially distinct and separate from the glass proper and the strengthening layer of pyroxylin plastic. That is, to say, in safety glass of the present invention there is used, with the glass layer and the strengthening layer, a layer which itself constitutes a ray screen, the ray-arresting ingredient being embodied in this layer and the layer being of some material, as a thin sheet of gelatin or transparent pyroxylin plastic, in which the ingredient is easily incorporated. Among other advantages which this structure has are the following two, both important: All difficulties which would arise from attempting to incorporate the ray-arresting ingredient in the glass proper or strengthening sheet are avoided; and the necessity of incorporating the large amount of ingredient (some are quite expensive while others are harmful when incorporated) necessary to be distributed through the relatively thick strengthening layer in order to protect it in that manner, is avoided, while at the same time the ingredient can, by virtue of the thin separate sheet, be concentrated at the surface of the strengthening sheet giving the maximum protection at the surface, as is, of course, desirable.

Structures embodying the invention may, of course, have various detail characteristics, such as the number of the layers, particular ray-arresting ingredient used, and so on. The ray screen may be initially attached either to the glass or to the strengthening sheet of pyroxylin plastic, or may be made up as an initially separate layer, laid between the glass and the strengthening layer and attached to them in the process of uniting the elements of the "sandwich" into a unitary whole. Thus, in certain cases it may be desirable to mix the ray-arresting agent with a thin gelatin, pyroxylin, or other solution to be sprayed on the glass or strengthening layer before, and to aid in the uniting of the glass and strengthening layer, and in this way provide the screen; or a very thin previously-made sheet of pyroxylin, gelatin or other suitable material, containing the arresting agent, may be attached to the principal pyroxylin plastic sheet before such sheet, together with the glass, is assembled into the stack ready for compositing into the sandwich. It will be understood that the embodying of the invention in the safety glass necessitates no departure from the usual and well understood methods of uniting the layers of the article, such methods embodying, in general, uniting the layers under heat and pressure supplemented if desired by heating gradually to initially soften the pyroxylin sheets, and so on, to facilitate the uniting of the layers as circumstances and convenience may dictate. As indicated above, the ray-arresting stratum may be of some other suitable bonding material than pyroxylin, as gelatin, rubber, resinous materials, and so forth.

As an example of the practice of the invention, there may be used two sheets of glass of a desired thickness, a strengthening sheet of pyroxylin plastic approximately .020" thick therebetween, and a ray-filter stratum of pyroxylin plastic, gelatin, or other bonding material about .0005 to several thousandths of an inch thick between the strengthening sheet and one of the glasses. The strengthening sheet is made with sufficient color, of the necessary kind, to neutralize the color given to the screen by the addition of sufficient non-actinic ingredients to arrest the actinic rays of the sun. The color of the strengthening sheet, therefore, depends upon the color of the filtering screen necessary to filter actinic rays. The determining factor, as regards color, is that the composite structure must be within the specifications for the particular use to which it is to be put. For example, if the product is to be used in automobile windshields, or as a bullet proof glass in banks, it must be relatively clear and water-white, whereas if it is to be used for automobile visors it must be green, blue, amber, or any other color specified.

As a more specific example, not to be interpreted as a limitation as to the colors, ingredients, methods, etc., I have found a product, comprising a central strengthening sheet with a ray screen and a sheet of glass on each side, and made as indicated below, to give very satisfactory results:—

(1) Approximate composition of strengthening sheet .020" thick. (Parts by weight.)

| | Parts. |
|---|---|
| Nitrocellulose | 73 |
| Camphor | 25 |
| Volatile solvent (alcohol) | 1.5 |
| Urea | .5 |
| Ultramarine | .003 |
| Violet lake | .001 |

(2) Approximate composition of ray filters in the character of binding layers, each .0005" thick. (Parts by weight.)

| | Parts. |
|---|---|
| Gelatine | 2.5 |
| Water | 97.5 |

(Vehicle for carrying actinic ray-arresting ingredient and binding glass to strengthening sheet.)

| | Part. |
|---|---|
| Ferric chloride | .25 |

(Actinic ray-arresting ingredient.)

| | Part. |
|---|---|
| Bichloride of mercury | .01 |

(Germicide.)

(3) Glasses: each of ordinary plate glass composition ground to approximately ⅛" thick.

(4) To composite, spray a binding layer on one side each of the two previously cleaned glasses and permit to dry. Place the strengthening sheet of pyroxylin plastic between the gelatin coated faces of the glass, heat the entire stack in a hydraulic press between felt pads to a temperature of approximately 120° C., and press for 15 seconds with about 500 pounds of pressure per square inch on the glass. Cool in the press while pressure is maintained. (The press plates may be heated by circulating steam and cooled by circulating water.)

I also found that it is entirely practical to use a ray filter or binding solution on one glass containing, say, twice the indicated amount of non-actinic ingredients, and a binding solution on the other glass containing a less amount of non-actinic ingredients, thus to afford more protection on one side, i. e. that that is to be exposed to the sun than on the other. This method is found advisable particularly for outdoor use where the said other side is protected by facing an enclosure; but it cannot be used to good advantage for indoor use or outdoor use where both sides are exposed equally to the actinic light. The strengthening sheet may be made by any of the regular methods of making pyroxylin plastic sheets, as may also the filter layer when provided as a previously-made initially separate sheet of pyroxylin plastic.

Evidently many types of structure may be made without departure from the invention, as structures with but one glass, or structures comprising a central glass (preferably about twice as thick as the outside glass) with, in order on each side, either a plain or a ray-arresting binding sheet of gelatin or the like, a strengthening sheet, a binding sheet in the character of a ray-filter, and a sheet of glass; also a filter of one specific character may be used on one side, and a filter of a different specific character may be used on the other, and in this way any objectionable color in one can be counteracted by the other. Also, the ray-filter sheet need not necessarily be an interior layer, although I prefer it to be so.

Although the invention has been described with more particular reference to a product embodying a strengthening layer of pyroxylin plastic, it will be understood, of course, that it may find application in products in which the layer liable to deteriorate is of material other than pyroxylin, for example, cellulose acetate, ethyl cellulose, etc.

I claim:

1. As an article of manufacture, a reenforced glass structure comprising a sheet of glass, a layer of material which tends to change color when exposed to actinic rays of light, and a ray-filter layer.

2. As an article of manufacture, a reenforced glass structure comprising a sheet of glass, a layer of cellulose ester plastic, and a ray-filter layer.

3. As an article of manufacture, a reenforced glass structure comprising a sheet of glass, a layer of pyroxylin plastic, and a ray-filter layer.

4. As an article of manufacture, a reenforced glass structure comprising a sheet of glass, a layer of material which tends to change color when exposed to actinic rays of light, and a layer of material having incorporated therein and distributed therethrough an actinism-proofing substance.

5. As an article of manufacture, a reenforced glass structure comprising a sheet of glass, a layer of material which tends to change color when exposed to actinic rays of light, and a layer of film-forming material having incorporated therein and distributed therethrough an actinism-proofing substance.

6. As an article of manufacture, a reenforced glass structure comprising, in order, a sheet of glass, a ray-filter layer, and a layer of material which tends to change color when exposed to actinic rays of light.

In testimony whereof I affix my signature.

JAMES H. SHERTS.